United States Patent [19]
Welsh et al.

[11] Patent Number: 6,089,287
[45] Date of Patent: Jul. 18, 2000

[54] PORTABLE WOOD PLANING MACHINE

[75] Inventors: Robert E. Welsh, Gettysburg, Pa.; Robert S. Gehret, Hampstead; Michael L. O'Banion, Westminster, both of Md.; P. Brent Boyd, Stewartstown, Pa.; Barry D. Wixey, Finksburg; Louis M. Shadeck, Timonium, both of Md.

[73] Assignee: Black & Decker Inc., Newark, Del.

[21] Appl. No.: 09/317,379

[22] Filed: May 24, 1999

Related U.S. Application Data

[62] Division of application No. 09/000,799, Dec. 30, 1997, Pat. No. 5,927,357, which is a continuation of application No. 08/659,684, Jun. 5, 1996, Pat. No. 5,771,949.
[60] Provisional application No. 60/000,453, Jul. 20, 1995, and provisional application No. 60/002,433, Jul. 27, 1995.

[51] Int. Cl.$^7$ ...................................................... B27C 1/00
[52] U.S. Cl. ........................................ 144/130; 144/117.1
[58] Field of Search ............................. 144/114.1, 117.1, 144/116, 129, 130

[56] References Cited

U.S. PATENT DOCUMENTS

| | | |
|---|---|---|
| B 294,579 | 1/1975 | Libicki ........................................ 82/11 |
| 1,802,096 | 4/1931 | Tautz . |
| 1,950,039 | 3/1934 | Smith et al. ................................ 82/25 |
| 2,577,975 | 12/1951 | Moore ................................. 144/117.1 |
| 2,624,382 | 1/1953 | Moore .................................... 144/116 |
| 2,780,251 | 2/1957 | Williams ................................ 144/130 |
| 2,859,780 | 11/1958 | Carlson .................................. 144/130 |
| 3,545,140 | 12/1970 | Jones . |
| 3,545,320 | 12/1970 | Anderson .................................... 82/34 |
| 3,704,956 | 12/1972 | Poss ........................................ 408/91 |
| 3,718,168 | 2/1973 | Berends ............................... 144/117.1 |
| 3,785,416 | 1/1974 | Anthony .................................. 144/116 |
| 3,913,642 | 10/1975 | Porter ................................... 144/114.1 |
| 4,067,370 | 1/1978 | Chang .................................. 144/117.1 |
| 4,118,141 | 10/1978 | Spohn, Jr. .................................. 408/90 |
| 4,335,768 | 6/1982 | Bachmann .................................. 145/4 |
| 4,363,343 | 12/1982 | Cuneo .......................................... 145/4 |
| 4,394,878 | 7/1983 | Rice et al. .............................. 144/131 |

(List continued on next page.)

FOREIGN PATENT DOCUMENTS

| | | |
|---|---|---|
| 93830201 | 5/1993 | European Pat. Off. . |
| 1 206 562 | 2/1960 | France . |
| 1 549 496 | 12/1968 | France . |
| 3541728 A1 | of 0000 | Germany . |
| 3541728 C2 | 3/1954 | Germany . |
| 760 672 | 3/1954 | Germany . |
| 1 068 129 | 10/1959 | Germany . |
| 20 27 175 | 12/1971 | Germany . |
| 25 52 484 | 5/1977 | Germany . |
| 27 28 587 | 1/1979 | Germany . |
| 32 27 351 C2 | 2/1984 | Germany . |
| 34 46 846 | 7/1985 | Germany . |
| 3615978 A1 | 11/1986 | Germany . |
| 296 04 100 U1 | 6/1996 | Germany . |
| 793889 | 4/1958 | United Kingdom . |
| 856178 | 12/1960 | United Kingdom . |

*Primary Examiner*—W. Donald Bray
*Attorney, Agent, or Firm*—Harness, Dickey & Pierce, P.L.C.

[57] ABSTRACT

An improved portable wood planing machine for the surface planing of wooden planks or boards is provided. In an exemplary embodiment, the planing machine includes a carriage assembly locking mechanism for locking the carriage assembly relative to a plurality of vertical support columns to thereby vertically fix the carriage assembly. In one form, the carriage assembly locking mechanism includes a plurality of levers which cooperate to engage the support columns of the carriage assembly. The exemplary embodiment further includes a depth stop adjustment mechanism which allows the operator to accurately select a minimum workpiece depth from one or more predetermined depths and a material removal indicator assembly operable for enabling the user of the planing machine to accurately determine the amount of material to be removed during each pass of the workpiece.

20 Claims, 12 Drawing Sheets

U.S. PATENT DOCUMENTS

| | | | |
|---|---|---|---|
| 4,436,126 | 3/1984 | Lawson | 144/130 |
| 4,436,462 | 3/1984 | Martinez | 409/218 |
| 4,440,204 | 4/1984 | Bartlett | 144/130 |
| 4,457,350 | 7/1984 | Finnila | 144/117 R |
| 4,485,859 | 12/1984 | Krogstad et al. | 144/252.1 |
| 4,932,448 | 6/1990 | Maioli et al. | 144/117.1 |
| 4,991,636 | 2/1991 | Robson | 144/116 |
| 5,174,348 | 12/1992 | Miyamoto et al. | 144/117.1 |
| 5,176,190 | 1/1993 | Miyamoto et al. | 144/117.1 |
| 5,284,192 | 2/1994 | Sato et al. | 144/117.1 |
| 5,771,949 | 6/1998 | Welsh, et al. | 144/130 |
| 5,794,675 | 8/1998 | Garcia | 144/130 |
| 5,795,113 | 8/1998 | Wixey et al. | 144/117.1 |
| 5,916,303 | 10/1998 | Shadeck | 144/130 |

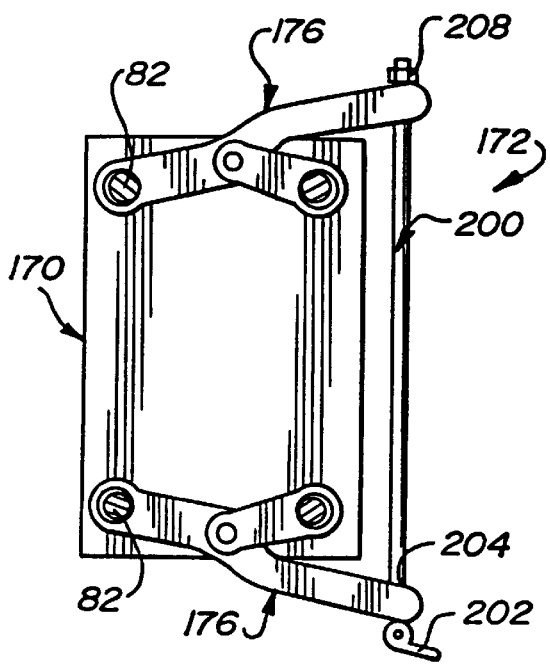
_Fig-9_
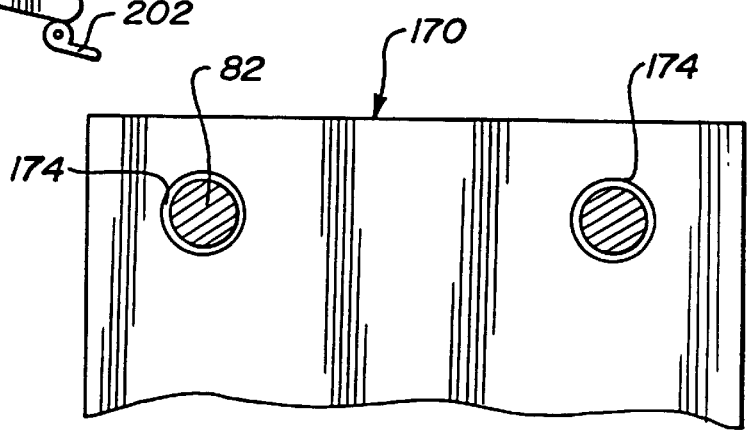
_Fig-10_
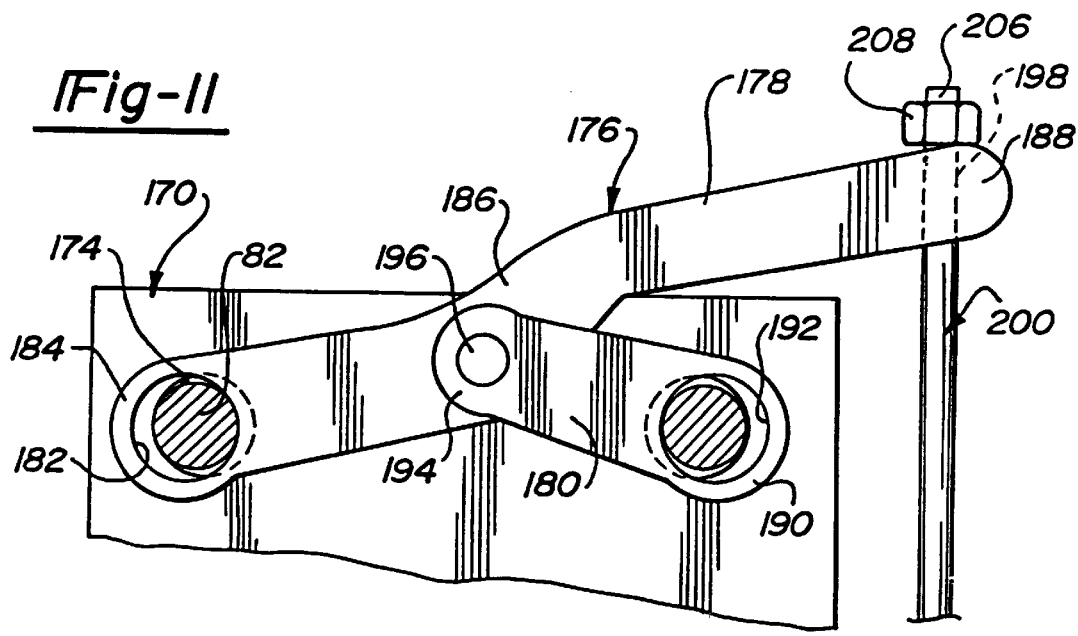
_Fig-11_

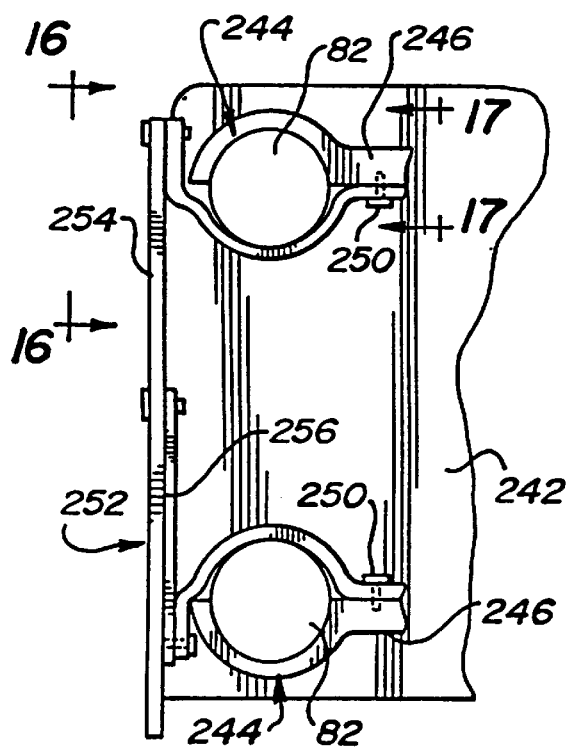
Fig-15
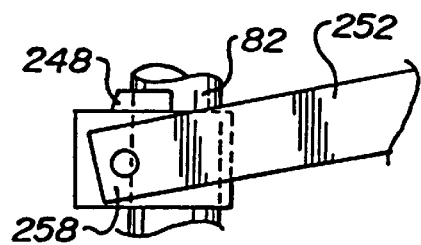
Fig-16
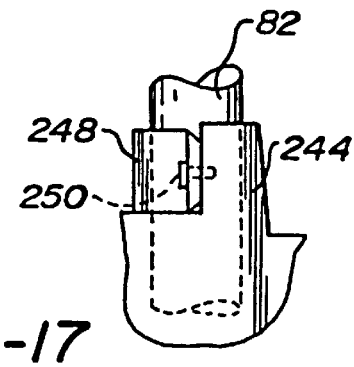
Fig-17
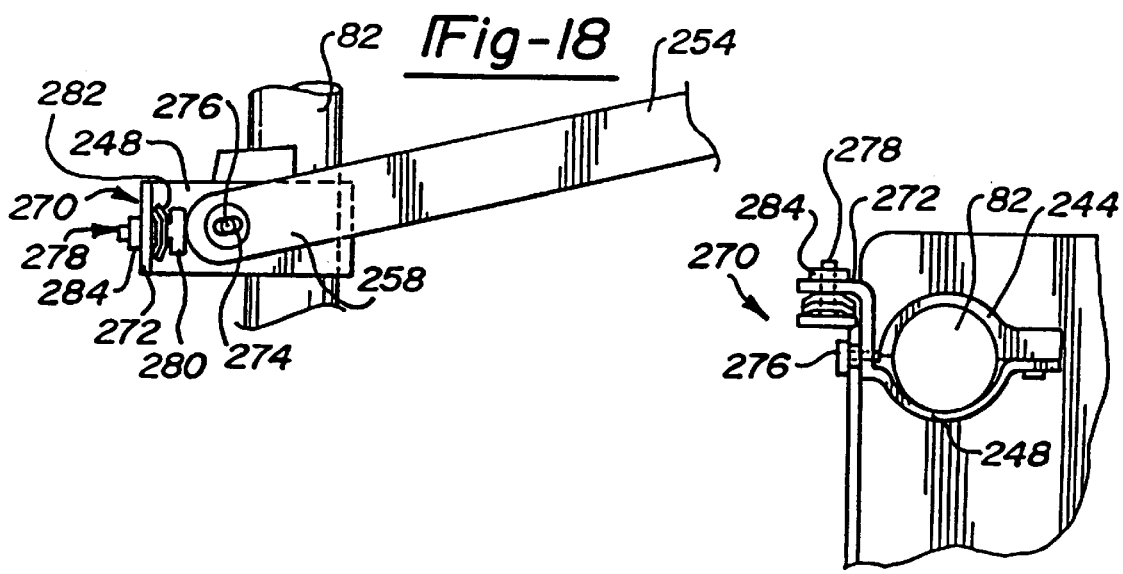
Fig-18
Fig-19

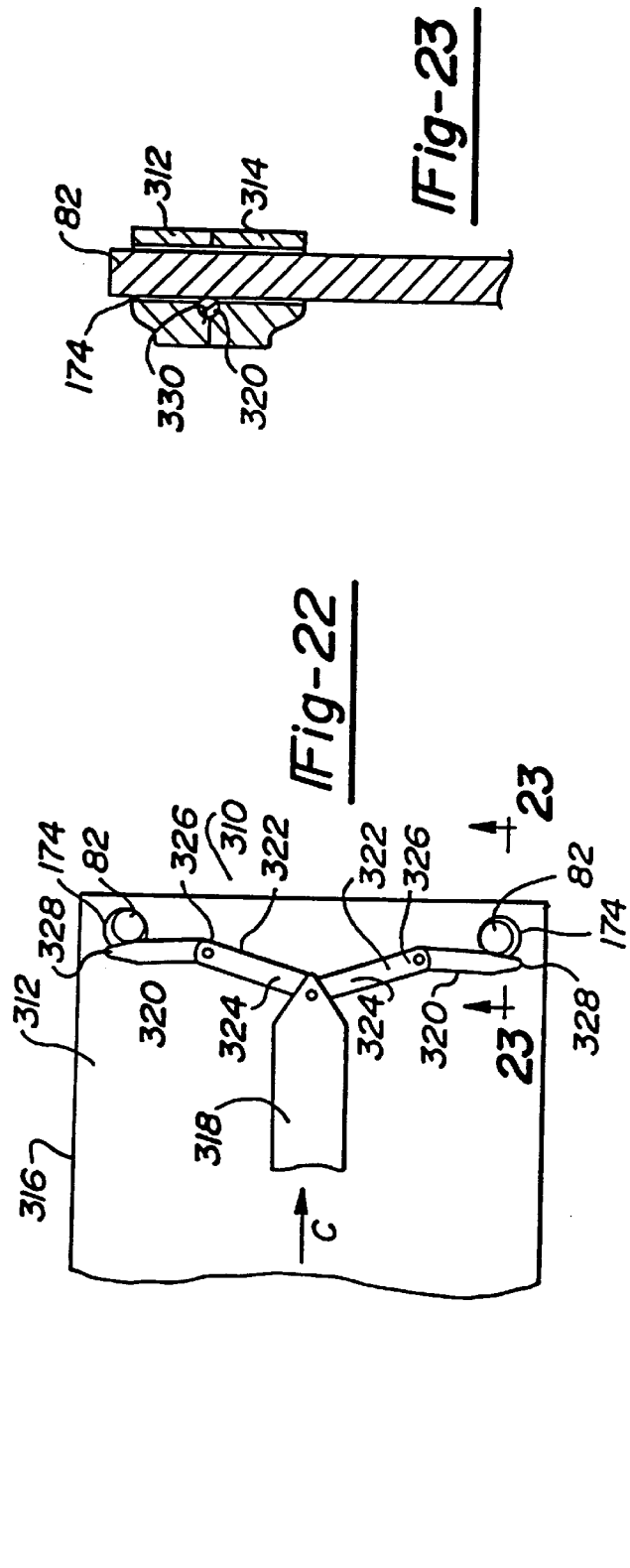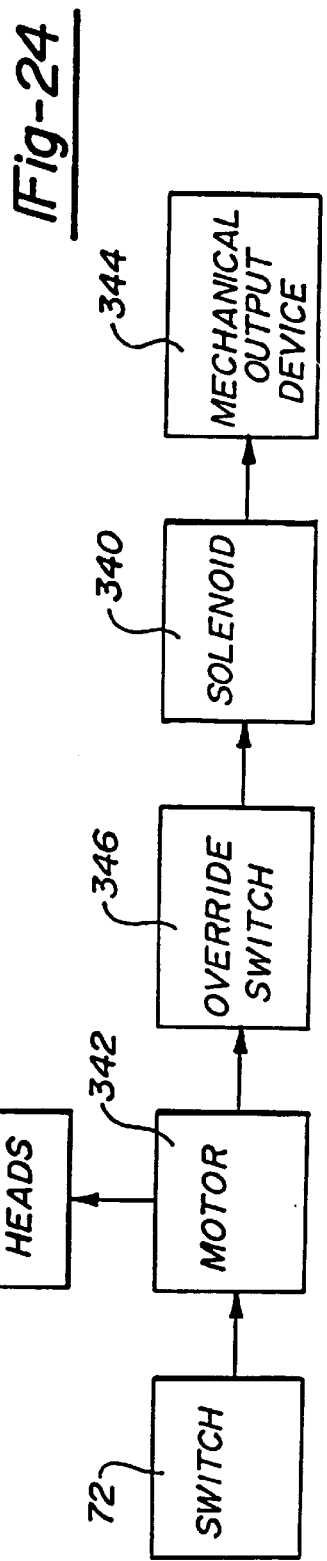

PORTABLE WOOD PLANING MACHINE

CROSS-REFERENCE TO RELATED APPLICATION

This is a division of U.S. patent application Ser. No. 09/000,799, filed Dec. 30, 1997, now U.S. Pat. No. 5,927,357 which is a continuation of U.S. patent application Ser. No. 08/659,684, filed Jun. 5, 1996, now U.S. Pat. No. 5,771,949 which claims priority from U.S. patent application Ser. No. 60/000,453, filed Jul. 20, 1995 and U.S. patent application Ser. No. 60/002,433, filed Jul. 27, 1995.

BACKGROUND OF THE INVENTION

1. Field of the Invention

The present invention generally relates to woodworking. More particularly, the present invention relates to a portable wood planing machine for the surface planing of wooden planks or boards.

2. Discussion

Various power tools are used in woodworking in an effort to efficiently and accurately cut workpieces to desired dimensions and surface quality. As is widely known, planing machines are often used for surface planing of wooden boards. A conventional planing machine typically includes one or more rotatably mounted cutting blades attached to a vertically movable carriage assembly. Also known are jointer machines which are typically used for the edge planing of wood. In certain applications, the functions of conventional planing machines and jointers are combined within a single unit commonly referred to as a jointer/planer machine.

In a typical wood planing machine, such as a surface planer, a selectively adjustable workpiece opening is defined between a carriage assembly and a support surface. The one or more rotationally mounted blades are carried on the underside of the carriage assembly adjacent the workpiece opening. The blades are adapted to remove a predetermined amount of material from the workpiece depending on the height of the workpiece opening. The carriage assembly also usually includes one or more feed rollers which urge the workpiece through the workpiece opening during operation of the wood planing machine.

In most applications, the carriage assembly of a wood planing machine is movably mounted to a plurality of support columns for movement with respect to a workpiece support surface, such as a base or platen. Such movement of the carriage assembly adjusts the vertical dimension of the workpiece opening so as to selectively determines the amount of material to be removed from the workpiece. Alternatively, in certain applicatons it is desirable to fixedly mount the carriage assembly and to adjust the workpiece opening by moving the base or platen vertically with respect to the carriage assembly.

In use, a workpiece is passed through the workpiece opening and a predetermined amount of material is removed from the surface of the workpiece adjacent the carriage assembly. Multiple passes of the workpiece through the workpiece opening are often necessary to obtain the desired thickness and surface quality. As with other woodworking operations, it is desirable that a planing machine accomplish workpiece preparation with precise tolerances, high surface quality, and a significant degree of reproducible results.

As a workpiece is passed through the workpiece opening, it is important that the carriage assembly remain vertically fixed with respect to the support platen. Slight movement of the carriage assembly negatively impacts the quality of cut. While it is known to provide a mechanism for arresting movement of the carriage assembly relative to the workpiece support surface, it is further desirable to provide a carriage assembly locking mechanism having a simple, yet effective arrangement for releasably fixing the carriage assembly relative to the support surface. It is additionally desirable to provide such a locking mechanism that does not interfere with the motor or cutting blades of the wood planing machine. Further, it is desirable to provide a carriage assembly locking mechanism operable to create an equal locking force at each of a plurality of support columns through the application of a minimal user input force. In certain applications, it may be further desirable to provide a carriage assembly locking mechanism which is automatically actuated when the motor of the wood planing machine is energized.

In the field of woodworking it is desirable to provide a wood planing machine having a stop mechanism which serves to physically stop the lowering of the carriage assembly at a predetermined depth. Additionally, it is desirable to provide a wood planing machine having a depth stop adjustment which may be more quickly and accurately set to a desired depth as compared to prior known devices. It is further desirable to provide a depth stop adjustment for a wood planing machine which provides for accurate repeatability for a plurality of common depth settings.

It is also known in the field of woodworking to provide a gauge for a wood planing machine which indicates the amount of material removed from a workpiece. While prior known devices are available for determining the amount of material removed from a workpiece, all are associated with one or more disadvantages. To overcome the disadvantages of prior known devices, it is desirable to provide a material removal indicator assembly for a wood planing machine from which the amount of material removed from a workpiece can be quickly obtained visually. Also, it is desirable to provide a material removal indicator assembly having a higher degree of accuracy as compared to prior known devices. Further, it is desirable to provide a material removal gauge adapted to assist the user in discerning between small increments.

SUMMARY OF THE INVENTION

According to a first aspect of the present invention, a portable wood planing machine is provided which includes a carriage assembly locking mechanism for locking the carriage assembly relative to a plurality of vertical support columns to thereby vertically fix the carriage assembly. In one preferred embodiment, the carriage assembly locking mechanism includes a plurality of linkages which cooperate to create a locking force between opposing pairs of the vertical support columns.

In another aspect, the present invention is directed to a depth stop adjustment mechanism for a planing machine which allows the operator to accurately select a minimum workpiece depth from one or more predetermined depths. In a preferred form, the depth stop adjustment mechanism includes a generally toroidal-shaped main body portion formed to include a perimeter having a ribbed surface and an upper surface with a plurality of threaded apertures. The threaded apertures are adapted to receive a corresponding plurality of depth set screws which may be adjusted to common depth settings. Downward movement of the carriage assembly of the planing machine can be selectively limited by one of the depth set screws.

In a further aspect, the present invention is directed to a material removal indicator assembly operable for enabling the user of a planing machine to accurately and easily determine the amount of material to be removed during each pass of the work piece. In a preferred form, the material removal indicator assembly includes a workpiece engaging member attached to the carriage assembly of a planing machine and adapted to be deflected by a workpiece as the workpiece is introduced into the planing machine. The material removal indicator assembly further includes an indicator which is mounted to the carriage assembly for pivotal movement in response to deflection of the workpiece engaging member. Preferably, the point of the indicator which contacts the workpiece engaging member is disposed relative to its pivot axis such that when the workpiece engaging member moves slightly, a tip of the indicator moves substantially more with respect to indicia on the carriage assembly numerically indicating the amount of material being removed from a workpiece. As a result, small adjustments to the amount of material to be removed from a workpiece are visually recognize more easily.

BRIEF DESCRIPTION OF THE DRAWINGS

Additional objects and advantages of the present invention will become apparent from a reading of the following detailed description of the preferred embodiments which makes reference to the drawings of which:

FIG. 9 is a simplified top view of a modified carriage assembly shown in operative arrangement with a first alternative carriage assembly locking mechanism;

FIG. 10 is an enlarged top view of a portion of the carriage assembly shown in FIG. 9 illustrating two of the vertical support columns in relationship to the casting of the carriage assembly, the vertical support columns being shown in an unloaded condition in which the carriage assembly is permitted to freely move vertically with respect thereto;

FIG. 11 is an enlarged top view of a portion of the carriage assembly locking mechanism of FIG. 9 showing one of the locking members in a locking state in which the vertical support columns illustrated are loaded so as to engage the side wall of their respective carriage assembly aperture and prohibit vertical movement of the carriage assembly;

FIG. 15 is an enlarged top view of a portion of the locking mechanism of FIG. 14;

FIG. 16 is front view taken in the direction of the line 16—16 of FIG. 15;

FIG. 17 a rear view taken in the direction of the line 17—17 of FIG. 16;

FIG. 18 is a partial view similar to FIG. 16 illustrating a tension adjustment mechanism;

FIG. 19 is a top view of the portion of the linkage arrangement shown in FIG. 18;

FIG. 22 is a top view of a fifth alternative carriage assembly locking mechanism operable for use with the portable wood planing machine of FIG. 1, illustrated with an upper casting portion of the carriage assembly removed for purposes of illustration;

FIG. 23 is a cross-sectional view taken through the lines 23—23 of FIG. 22 illustrated to further include the upper casting portion of the carriage assembly;

FIG. 24 is a schematic diagram illustrating the electronic actuator of the present invention and its electrical interconnection with the planing machine of FIG. 1;

DETAILED DESCRIPTION

As required, detailed embodiments of the present invention are disclosed herein. However, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

The present invention provides an improved portable wood planing machine for the surface planing of a workpiece such as a wooden board or plank. As will become apparent below, the present invention more particularly relates to various features of a planing machine. Many of these various features, which are described in detail below, are shown cooperatively arranged within a single planing machine. However, it will be appreciated that the scope of the present invention as it independently relates to each of the features described is not so limited. In other words, while an exemplary embodiment of a planing machine is shown and described, it will be understood that the various features may be utilized independent from one another.

The principal features of the present invention which will be described in detail below relate generally to: 1) various embodiments of a carriage assembly locking mechanism; 2) a depth stop adjustment mechanism; and 3) a material removal indicator assembly. Prior to addressing the various features of the present invention, an understanding of an exemplary machine into which such features may be incorporated is warranted.

Figure 1:
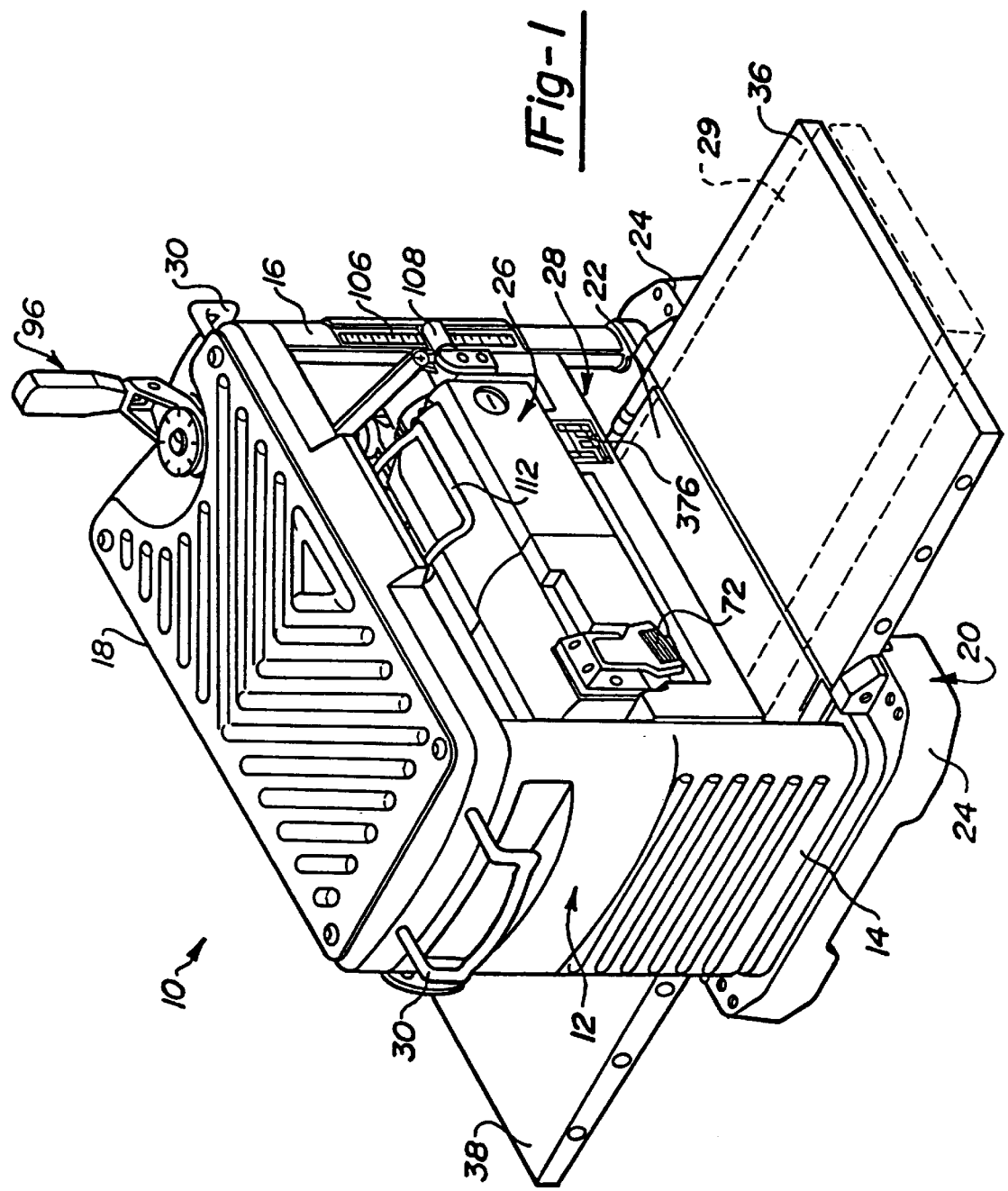
FIG. 1 is a perspective view of a portable wood planing machine constructed in accordance with a preferred embodiment of the present invention illustrating a workpiece such as a wooden board in broken lines partially inserted between the carriage assembly and platen of the planing machine.
Figure 2:
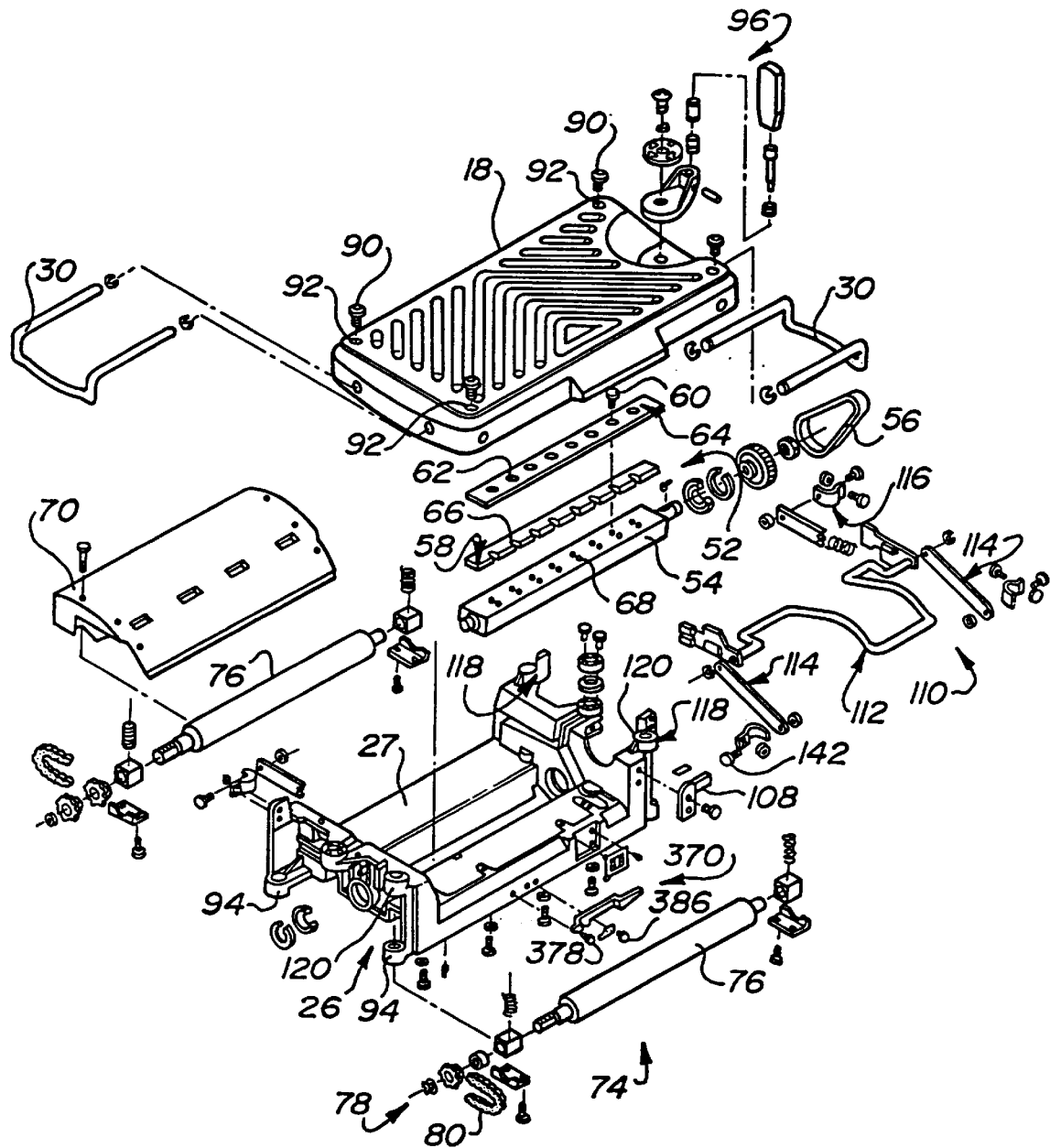
FIG. 2 is an exploded perspective view of various elements of the portable wood planing machine of FIG. 1 generally associated with an upper portion thereof.
Figure 3:
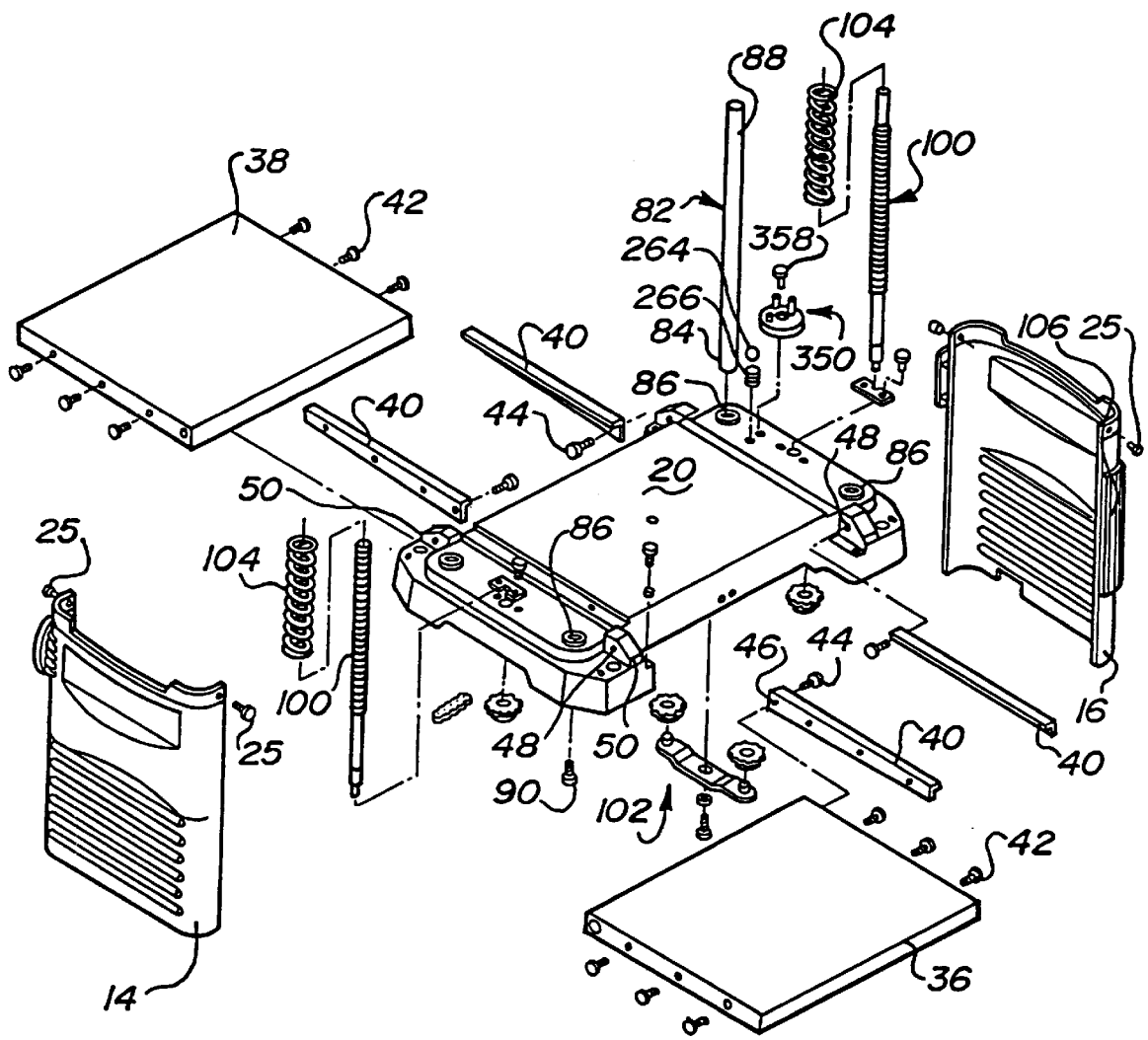
FIG. 3 is an exploded perspective view of various elements of the portable wood planing machine of FIG. 1 generally associated with a lower portion thereof.

Turning generally to the drawings in which identical or equivalent elements have been denoted with like reference numerals and specifically to FIGS. 1 through 3 thereof, an exemplary wood planing machine constructed in accordance with the teachings of the present invention is illustrated and identified generally at reference numeral 10. The planing machine 10 is shown to include a frame 12 having a pair of opposing sides 14 and 16, a top 18 and base 20 including a support platen 22 and a pair of support feet 24. The elements of the frame 12 are interconnected in 10 a conventional manner with threaded fasteners 25.

The planing machine 10 is also shown to include a carriage assembly 26 including an integrally formed casting 27. The carriage assembly 26 cooperates with the support platen 22 to define a workpiece opening 28. In one application, the workpiece opening 28 of the portable wood planing machine 10 is sized to accommodate a workpiece 29 (shown in hidden lines in FIG. 1) having a nominal width of twelve and one-half inches or less. Transfer of the portable planing machine 10 is facilitated through a pair of carry handles 30 extending from opposing sides of the top 18 which are retractable to storage positions.

The planing machine 10 also includes forwardly extending and rearwardly extending feed tables 36 and 38 for further supporting the workpiece during operation of the planing machine 10. The forwardly and rearwardly extending feed tables 36 and 38 are each pivotally attached to the base 20 through a pair of support arms 40 which are attached to the feed tables 36 and 38 with fasteners. More specifically, fasteners 44 pass through apertures 46 formed in the ends of the support arms 40 and engage threaded apertures 48 formed in integrally formed boss portions 50 of the base 20. As a result, the forwardly and rearwardly extending feed tables 36 and 38 are upwardly foldable from their positions shown in FIG. 1 to storage positions substantially adjacent the front and rear of the planing machine 10, respectively.

With reference to the exploded view of FIG. 2, a cutter head assembly 52 is shown to be carried by the carriage assembly 26 adjacent the workpiece opening 28 and is generally identified with reference numeral 52. The cutter head assembly 52 includes a cutter head 54 rotationally mounted to the carriage assembly 26 in a generally conventional manner and driven by a belt 56 interconnected to an electric motor (not shown). The cutter head assembly 52 further includes at least one blade 58 removably attached to the cutter head 54. As illustrated, the blade 58 is attachable to the cutter head 54 by fasteners 60 which pass through holes 62 formed in a retention plate 64 and slots 66 in the blade 58 and engage aligning threaded apertures 68 formed in the cutter head 58. Power to the motor is controlled by a manually operated switch 72 extending from the front face of the carriage assembly 26. During normal operation, the cutter head assembly 52 is shielded by a cover 70 assembly. The cover 70 is removably attached to the carriage assembly 26 in a conventional manner to facilitate blade replacement.

A workpiece feed arrangement 74 including a pair of feed rollers 76 is also carried by the carriage assembly 26. The feed rollers 80 are positioned adjacent the workpiece opening 28 and are driven by a motor (not shown) located within the carriage assembly 26. A drive arrangement 78 includes a drive chain (partially shown in FIG. 2 at 80) which interconnects the motor and the pair of feed rollers 76. During operation, rotation of the feed rollers 80 functions to draw the workpiece 29 through the workpiece opening 28 at a controlled rate and further functions to position the workpiece 29 a constant vertical distance from the cutter head 54.

With specific reference to the exploded views of FIGS. 2 and 3, the carriage assembly 24 is shown to be slidably mounted to a plurality of support columns or support posts for bi-directional vertical movement FIG. 3 illustrates one of the support columns which has been identified with reference numeral 82. Each of the plurality of support columns 82 is generally cylindrical and includes a lower end 84 which engages a circular recesses 86 formed in the base 20 of the frame 12. The support columns 82 also include upper ends 88 which engage similar recesses (not shown) formed in the underside of the top 18. Threaded fasteners 90 pass through apertures 92 in the top 18 and base 20 and engage tapped holes (not shown) in the lower and upper ends 84 and 80 of the support columns 82. In the embodiment illustrated, four support columns 84 support the carriage assembly 24. The carriage assembly 24 may selectively be translated upward or downward along a path of travel and is guided by integrally formed apertures 94 located in the four corners casting 26 of the carriage assembly 24.

The depth of cut of the workpiece 40 is selected through adjustment of the height of the carriage assembly 26 relative to the base 20. Adjustment is controlled through manual rotation of a handle assembly 96 interconnected to a pair of drive rods 100. The drive rods 100 threadably engage the casting 27 of the carriage assembly 26 and are interconnected at their lower ends with a sprocket arrangement 102

A coil spring 104 surrounds the lower portion of each of the drive rods 100. The coil springs 104 are operative for producing an upwardly directed force which opposes a substantial portion of the weight of the carriage assembly 26. As a result, a comparable amount of effort is required for vertically advancing the carriage assembly 26 in either of an upward direction or a downward direction.

The arrangement for translating the carriage assembly 26 is described in further detail in U.S. Ser. No. 08/659,685, filed concurrently herewith and entitled "Apparatus for Adjusting the Relative Positions of Two Components of a Power Tool". U.S. Ser. No. 08/659,685 is incorporated by reference as if fully set forth herein.

As shown in FIG. 2, a depth scale 106 is attached the side 14 of the frame 12 which is marked with indicia indicating the desired thickness for the workpiece 29. The depth scale 106 cooperates with a pointer 108 carried by the carriage assembly 26. As the carriage assembly 26 is vertically translated, the location of the pointer 108 on the depth scale 106 indicates the desired thickness of the workpiece 29.

With the foregoing description of the wood planing machine 10 shown in FIGS. 1 through 3 as background, the various principal features of the present invention will now be described.

With continued reference to FIGS. 1 through 3 and additional reference to FIGS. 4 through 8, a first preferred embodiment of a carriage assembly locking mechanism 110 constructed in accordance with the present invention will now be described. With initial reference to the exploded view of FIG. 2. the carriage locking mechanism is shown to include a manual operable handle 112 two pairs of cooperating locking linkages 114 and post clamps 116 associated with each of the four vertical support posts 82.

The post clamps 116 are formed of metal or other suitable memory retaining material and are attached to a mounting member 118 integrally formed with the casing 27. As illustrated, each of the post clamps 116 includes an arcuate clamping portion 120 and a mounting flange 122. The mounting flange 122 includes a pair of apertures 124 which align with apertures 126 formed in a mounting surface 128 of the mounting members 118. The mounting members 118 also include a generally cylindrical guide portion 130 which cooperate with aperture 94 for vertically guiding of the carriage assembly 26. As will become apparent below, the post clamps 116 are resiliently deflectable from a normal, unclamped position to a clamped position. When in their clamped positions, the post clamps 116 engage their associated support post 82 and thereby prevent vertical translation of the carriage assembly 26.

A locking force for deflecting the post clamps 116 is created by the two pairs of locking linkages 110 in response to selective movement of the handle 112. Each pair of the locking linkages 110 is substantially identical and is operable to create a locking force for two of the vertical support posts 82. Given the similarity of the two pairs of locking linkages 110, a complete understanding can be had through reference to the single pair 110 shown in FIGS. 4 through 6.

As illustrated, each pair of locking linkages 110 includes a first linkage of fixed length 134 pivotally attached to a second linkage 136 of variable length for relative rotation about a pivot defined by a reduced diameter end 138 of the handle 112. Opposite ends of the fixed and variable length linkages 134 and 136 are pivotally interconnected with two of the second post clamps 116. To this end, the opposite ends of the fixed and variable length linkages 134 and 136 are formed to include apertures 140 which receive fasteners 142 and pass through formed apertures 144 in the post clamps 116.

Figure 4:
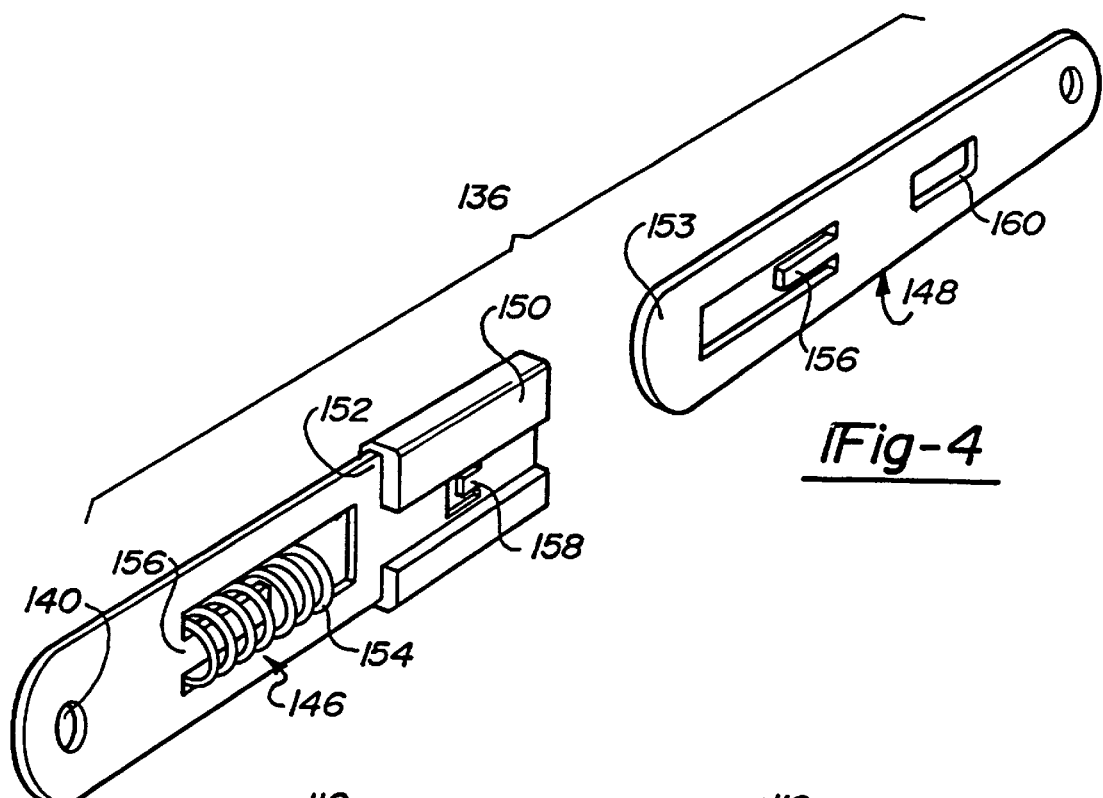
FIG. 4 is an enlarged perspective view of the compressible linkage of a preferred embodiment of a carriage assembly locking mechanism of the present invention shown in FIG. 2 the compressible linkage illustrated prior to assembly.

As specifically shown in FIG. 4, the variable length linkage 110 includes first and second members 146 and 148 which are telescopically related. In this regard, an end 150 of the first member 146 of the variable length linkage 110 is integrally formed to partially define a channel 152 for telescopically receiving an adjacent end 153 of the second member 148. A biasing member preferably in the form of a coil spring 154 is captured by the first and second members 146 and 148 of the variable length linkage 110. The coil spring 154 is retained by opposing prong tabs 156 integrally formed with each of the first and second members 146 and 148 which the coil spring 154 surrounds.

As shown in the enlarged perspective view of FIG. 4, the first member 146 of the compressible linkage 136 includes a tab 158 which is used to secure the first and second members 146 and 148 in a telescopic relationship. When the second member 148 is initially telescopically received by the first member 146, the tab 158 of the first member 146 is inelastically bent out of the plane of the first member 146 toward the second member 148 where it is permitted to engage a longitudinally oriented slot 160 therein. The limits of travel of the second member 148 telescopically relative to the first member 146 are defined by the longitudinal slot 160.

Figure 5:
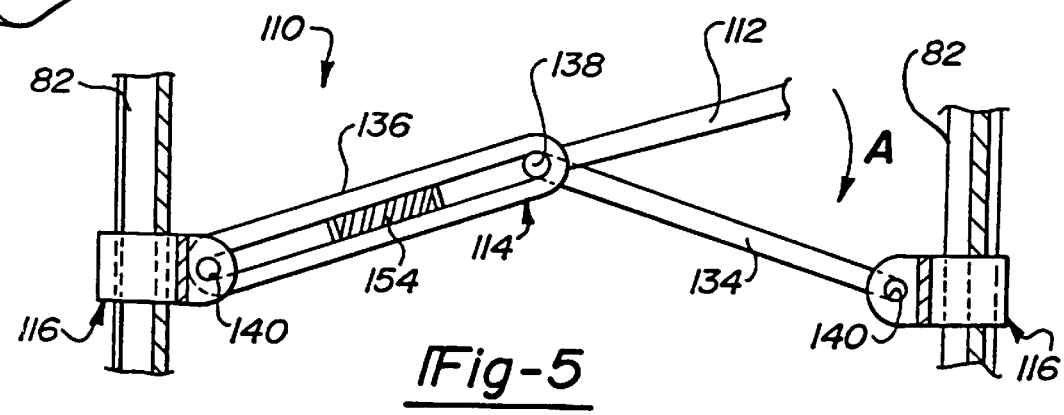
FIG. 5 is a simplified side view of the carriage assembly locking mechanism of FIG. 2 shown in an unlocked condition.
Figure 6:
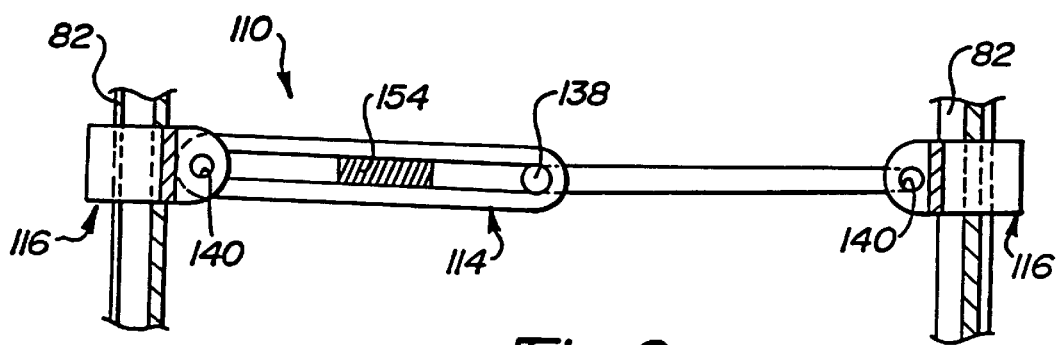
FIG. 6 is a simplified side view of the carriage assembly locking mechanism of FIG. 2 shown in a locked condition.
Figure 7:
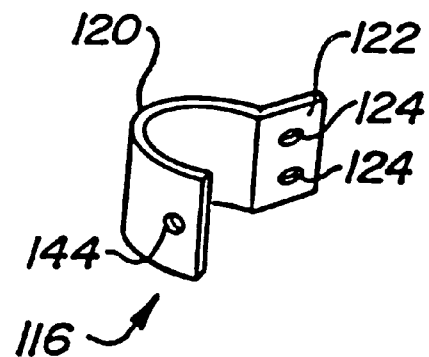
FIG. 7 is an enlarged view of one of the post clamps of FIG. 2.
Figure 8:
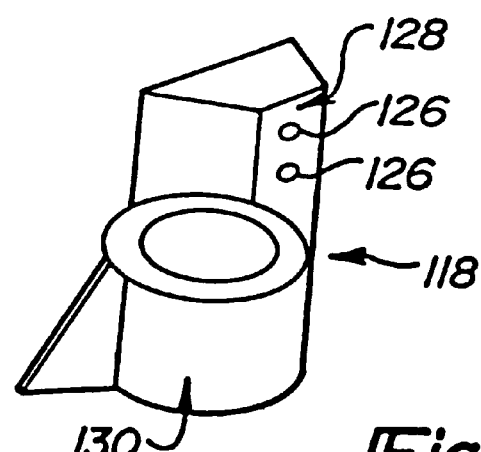
FIG. 8 is an enlarged view of one of the mounting members of FIG. 2.

As specifically shown in FIGS. 5 and 6, the first and second linkages 134 and 136 are rotatable relative to one another between a unclamped position (shown in FIG. 5) and a clamped position (shown in FIG. 5). Such rotation of the linkages 13 and 136 is directly controlled by the handle 112. In the unclamped position of FIG. 5, clamping surfaces 120 of the post clamps 116 are displaced from the vertical support columns 82 and vertical translation of the carriage assembly 26 is permitted. When the handle 112 is rotated downwardly as shown by the arrow identified with reference letter A in FIG. 5, the locking linkages 134 and 136 are rotated to an overcenter position and a clamping force causes the vertical support columns 82 to be clamped by the post clamps 116. The biasing member 154 of the compressible linkage 146 functions to maintain a moderate clamping force throughout rotation of the locking linkages 134 and 136 relative to one another. As a result, the locking linkages 134 and 136 can be moved from their overcenter position without undue force being applied to the handle 112.

Turning to FIGS. 9 through 11, a modified casting 170 is illustrated in cooperative association with a first alternative carriage assembly locking mechanism 172 With initial reference to FIG. 9, a simplified view of the casting 170 is illustrated removed from the remainder of the planing machine 10 and is shown to include four apertures 174. The four apertures 174 are adapted to receive a corresponding number of support columns 82. As is shown in the enlarged partial top view of FIG. 10, the apertures 174 are toleranced with respect to their corresponding support column 82 such that a minimal amount of operating clearance normally is present between the support columns 82 and their respective apertures 174 when the support columns 82 are not under load. This operating clearance permits the carriage assembly 26 to normally move freely in a vertical direction with respect to the support columns 82 when the handle assembly 96 is operated.

The first alternative carriage assembly locking mechanism 172 is shown to include first and second substantially symmetrical locking linkages 176. As will become apparent, each of the locking linkages 176 is operable to create a locking force between two of the vertical support columns 82 and their respective apertures 174. Given the symmetry of the locking linkages 176, a complete understanding can be had through reference to a first of the locking linkages 176 shown in an enlarged view in FIG. 11. As shown in FIG. 11, the locking linkage 176 includes a first member 178 and a second member 180. The first member 178 is generally S-shaped and includes an aperture 182 located adjacent a first end 184 for rotatably receiving one of the vertical support columns 82. In the exemplary embodiment illustrated, the first member 178 of the locking linkage 176 includes an intermediate segment 186 interconnecting the first end 184 and a second end 188. The second end 188 extends forwardly beyond the carriage assembly 26. The second member 180 of the locking linkage 176 includes a first end 190 having an aperture 192 for receiving a second of the vertical support columns 82 and a second end 194 pivotally attached to the first member 178 with a pivot pin 196.

The locking linkage 176 is movable between an unlocked condition in which the carriage assembly 26 is permitted to move freely in a vertical direction with respect to the vertical support columns 82 and a locked condition in which such vertical movement is prohibited. The locked condition is shown in FIG. 11 in which the locking linkage 176 deflects the vertical support column 82 into the sides of their corresponding apertures 174. When the first member 178 of the locking linkage 176 is rotated in a clockwise direction (as shown with reference to FIG. 11), opposing forces are created by the first and second members 178 and 180 against the vertical support columns 82. These forces result in deflection of the vertical support columns 82 which is limited by the apertures 174 in the casting 170 and create significant frictional forces between the vertical support columns 82 and the carriage assembly 26. The geometry of the locking linkage 176 permits a relatively small force to be applied to the second end 188 of the first member 178 for causing a high force to be developed by the locking linkage 176 against the vertical support columns 82.

With continued reference to FIGS. 9 and 11, the second end 188 of each of the first members 178 are formed to include aligning horizontal apertures 198 through which a draw link 200 is passed. A quick release cam lever 202 is provided at a first end 204 of the draw link 200 for the application of force to move each of the locking linkages 176 to its locked position. At the second end 206 of the draw link 200, an adjusting nut 208 is provided for setting the load required to move the locking linkages 176 to their locked condition.

Figure 12:
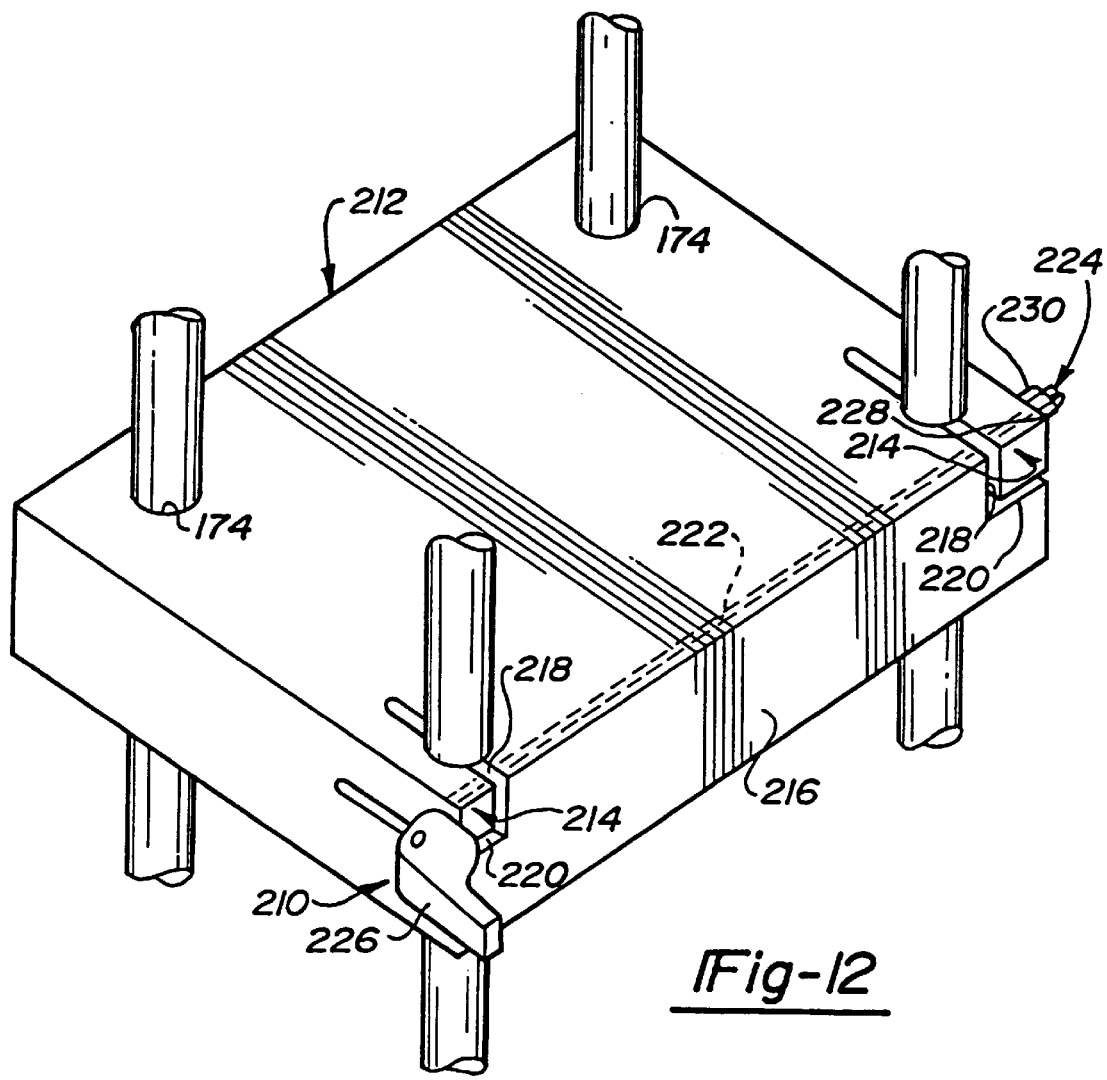
FIG. 12 is a simplified perspective view of a second alternative embodiment of a carriage assembly locking mechanism constructed in accordance with the teachings of the present invention.

With reference to FIG. 12, a second alternative embodiment of a carriage assembly locking mechanism 210 will be described. Similar to the first alternative embodiment, the carriage assembly locking mechanism 210 includes a carriage assembly 26 having a casting 212 formed to include apertures 174 (not specifically shown with respect to the second embodiment) for receiving the vertical support columns 82 of the planing machine 10. As is shown with respect to the first alternative embodiment in FIG. 10, an operating clearance normally exists between the vertical support columns 82 and their corresponding apertures 174 which permits relatively free movement of the carriage assembly 26 in a vertical direction.

As shown in FIG. 12, the casting 212 of the carriage assembly 26 is formed to integrally include a pair of column clamping portions 214 associated with two of the vertical support columns 82. In the embodiment illustrated, the pair of column clamping portions 214 are arranged to cooperate with the two vertical support columns 82 located adjacent a front face 216 of the carriage assembly casting 212. Both of the column clamping portions 214 are defined by a vertical casting split 218 which intersects a horizontal casting split 220. The vertical casting split 218 is disposed so as to intersect the casting aperture 174 of the corresponding vertical support column 82. The vertical casting split 218 extends rearwardly slightly beyond its corresponding vertical support column 82 and extends forwardly to the front face 216 of the carriage assembly casting 212. In the embodiment illustrated, the horizontal castng split 220 rearwardly extends a distance substantially equivalent to the vertical casting split 218 and similarly extends forwardly to the front face 216 of the carriage assembly casting 212.

An aperture 222 is vertically formed through the carriage assembly casting 212 which passes through both of the column clamping portions 214 and which is adapted to receive a draw bolt 224. Adjacent a first end (not shown) of the draw bolt 224, an eccentric locking lever 226 is provided which is movable between a locked position (as shown in FIG. 12) and an unlocked position. At a second end 228 of the draw bolt 224, an adjusting nut 230 is provided which allows the force necessary to move the eccentric locking lever 226 to its dosed position to be adjusted.

In use, when the eccentric locking lever 226 is rotated to its locked position, the column clamping portions 214 are resiliently flexed inwardly causing the normally present operating clearances between the casting apertures 174 and vertical support columns 82 to be eliminated. As a result, vertical movement of the carriage assembly 26 with respect to the vertical support columns 82 is substantially prevented. When the eccentric locking lever 226 is returned to its unlocked position, the column clamping portions 214 resiliently return outwardly such that the operating clearances are returned between the apertures 174 and the support columns 82.

With reference to FIGS. 13 through 17, a third alternative embodiment of a carriage assembly locking mechanism 240 will be described. In a manner similar to that shown in FIG. 10 in connection with the first alternative embodiment, the third alternative embodiment includes a carriage assembly casting 242 which is formed to include four apertures 174 for receiving the vertical support columns 82 of the planing machine 10. Also consistent with the prior described embodiments, the apertures 174 are toleranced so as to provide a normally present operating clearance between the circumferential side wall of the apertures 174 and the corresponding vertical support column 82.

The casting 242 is illustrated to include four upwardly extending boss portions 244 adapted to cooperatively engage the four support columns 46. In the preferred embodiment, the boss portions 244 are unitarily formed with the casting 242 and are generally C-shaped with an inner surface adapted to contact the corresponding support column 82. The boss portions 244 also include a flange area 246. Each of the boss portions 244 is specifically adapted to cooperate with a clamping portion 248 for clamping one of the support columns 82 and thereby vertically fixing the carriage assembly 26 with respect to the support columns 82. The cooperating clamping portions 248 and boss portions 244 are joined by a threaded fastener 250 and define an aperture for receiving the support column 82. The clamping portions 248 are constructed of a suitable resilient material such as metal and the like so that they are each deflectable between a clamping position and a release position. Normally, the clamping portion 248 is in its release position and clearance is provided between the support column 82 and the aperture cooperatively defined by the clamping portion 248 and the boss portion 244 such that the carriage assembly 26 can be vertically moved with respect to the support columns 82.

The locking mechanism 240 is further shown to include a pair of substantially identical linkage arrangements 252. One of the linkage arrangements 252 is specifically adapted to cooperate with a first pair of support columns 82 adjacent the front of the carriage assembly 26, while the other of the linkage arrangements 252 cooperates with a second pair of support columns 82 adjacent the rear of the carriage assembly 26. More specifically, each linkage arrangement is shown to includes a first link 254 and a second link 256. At a first end 258, the first link 254 is pivotally interconnected to the clamping portion 248 associated with one of the support columns 82. A first end 260 of the second link 256 is similarly pivotally attached to an adjacent clamping portion 248, while the second end 262 is pivotally attached to the first link 254. A second end 262 of each of the first links 254 are joined by a handle 266.

Figure 13:
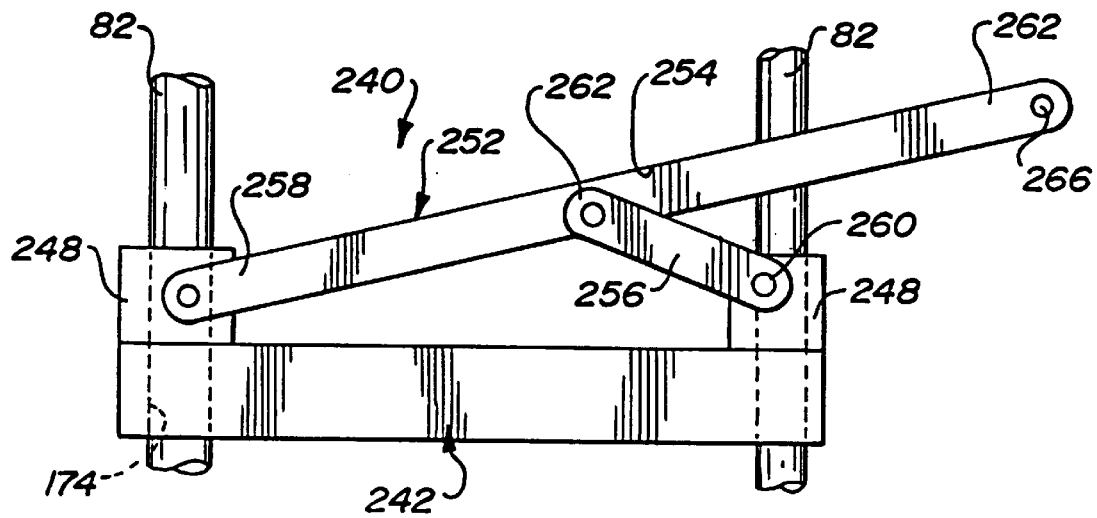
FIG. 13 is a side view of a third alternative carriage assembly locking mechanism operable for use with the portable wood planing machine of FIG. 1.
Figure 14:
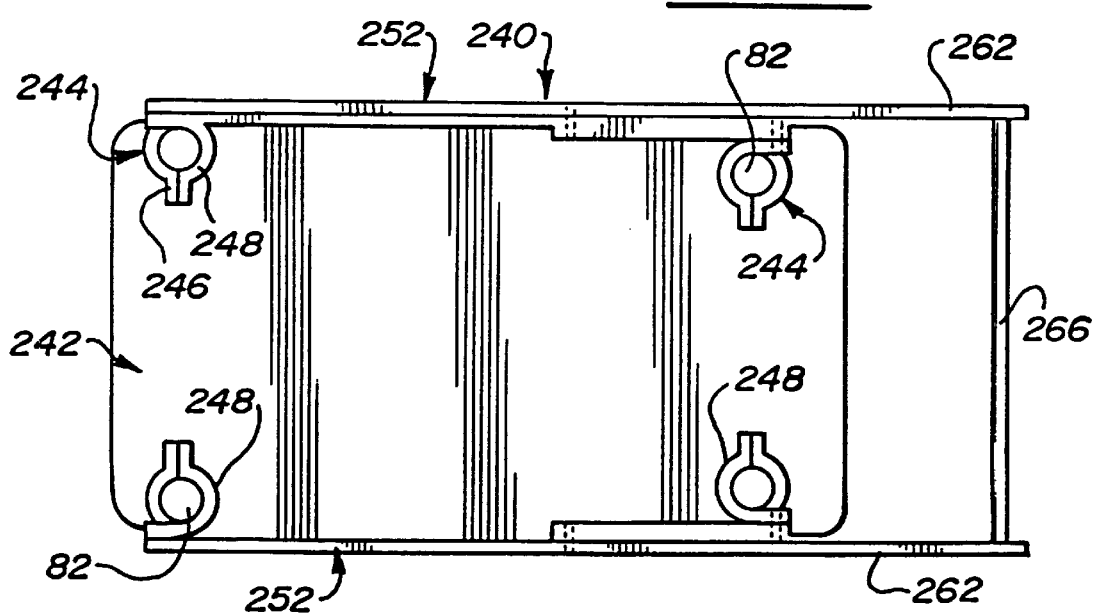
FIG. 14 is a top view of the locking mechanism of FIG. 13.

In operation, the linkage arrangements 252 are simultaneously controlled by moving the handle 266 between an upper position and a lower position. In the upper position (as shown in FIG. 13) each of the clamping portions 248 is in its release position and the carriage assembly 26 is permitted to move vertically with respect to the support columns 82.

As the handle 266 is moved to the lower position, the clamping portions 248 are resiliently deflected to their clamping positions causing the cooperating clamping portions 248 and boss portions 244 to "pinch" the support columns 82 and thereby prevent vertical movement of the carriage assembly 26.

With reference to FIGS. 18 and 19, the interconnection between the linkage arrangement 252 and the clamping portion 248 is shown to alternatively incorporate a tension adjustment mechanism 270. As illustrated, the construction of the clamping portion 248 is modified to include an outwardly extending flange 272. The first end 258 of the first link 254 is modified to incorporate an adjustment slot 274 through which a threaded fastener 276 passes for pivotally interconnecting the first link 254 with the clamping portion 248. An adjustment bolt 278 having a head 280 adapted to abut the first end 258 of the first link 254 passes through an aperture (not shown) formed in the flange 272. A plurality of Belville washers 282 is interdisposed between the flange 272 and the head 280 of the bolt 278. An adjustment nut 284 is provided on the opposite side of the flange 272 for adjusting the tension imparted to the first link 254 by the Belville washers 282.

Figure 20:
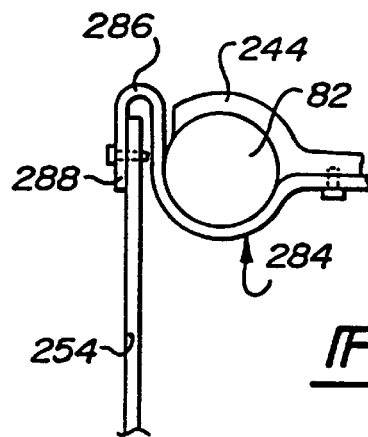
FIG. 20 is a view similar to FIG. 19 showing an alternative interconnection of the linkage arrangement of FIG. 13.

With reference to FIG. 20, a clamping portion 284 having an alternate construction is illustrated. Similar to the clamping portion 248, clamping portion 284 is adapted to cooperate with one of the boss portions 244 for "pinching or clamping" the support columns 82 to vertically fix the carriage assembly 26 with respect to the support columns 82. The construction of the clamping portion 284 is alternatively shown to incorporate a generally U-shaped portion 286. One of the first and second links 254 and 256 (e.g., the first link 254 in FIG. 20) is pivotally interconnected with the clamping portion 284 at an outer leg 288 of the U-shaped portion 286.

Figure 21:
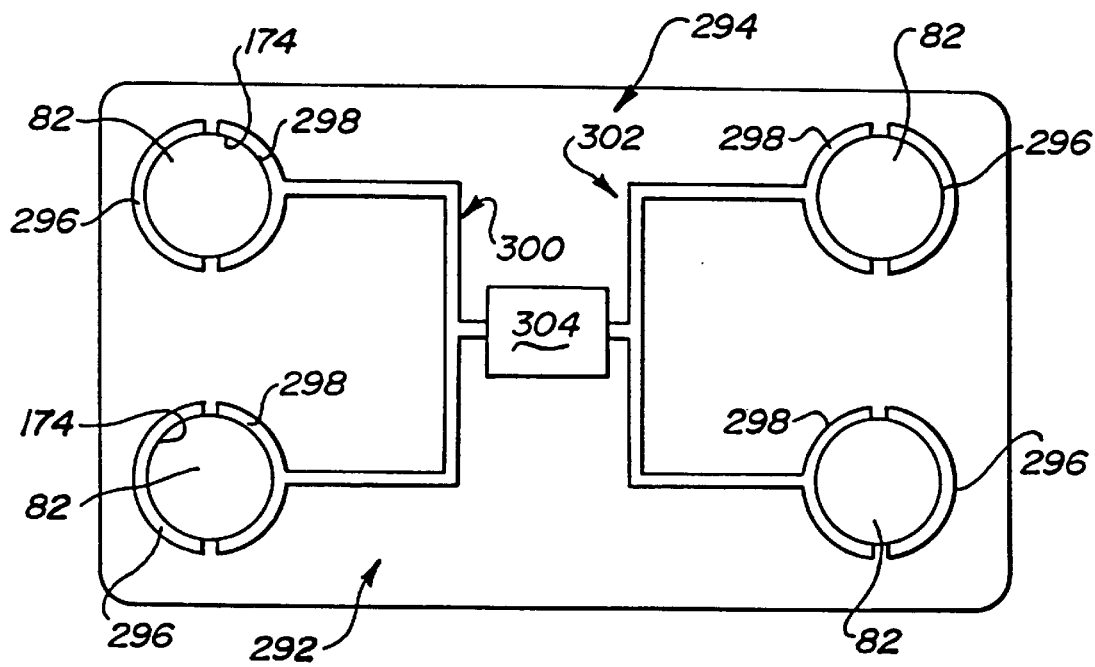
FIG. 21 is a top view of a fourth alternative carriage assembly locking mechanism operable for use with the portable wood planing machine of FIG. 1.

With reference to FIG. 21, a fourth alternative embodiment of a carriage assembly locking mechanism 292 will be described. Again, in a manner similar to that shown in FIG. 10, the locking mechanism 292 includes a carriage assembly casting 294 which is formed to include apertures 174 for receiving the vertical support columns 82 of the planing machine 10. Also consistent with the prior embodiments, the apertures 174 are toleranced so as to provide a normally present operating clearance between the circumferential side wall of the apertures 174 and the corresponding vertical support column 82.

Similar to the third alternative embodiment described above with reference to FIGS. 13 through 16, the locking mechanism 292 is formed to include a plurality of upwardly extending boss portions 296. As illustrated, the locking mechanism 292 includes four boss portions 296 arranged to cooperatively engage each of the support columns 82. The boss portions 296 are generally C-shaped. Each of the boss portions 296 is adapted to cooperate with a complementary clamping portion 298.

The locking mechanism 292 is further shown to include a first linkage arrangement 300 associated with a first pair of the support columns 82 and a second linkage arrangement 302 associated with the other pair of support columns 82. The first and second linkage arrangements 300 and 302 are substantially identical and serve to interconnect an electric actuator 304 and each of the clamping portions 298. The first and second linkage arrangements 300 and 302 are each moveable between a clamping position and a release position. Movement between these two positions is controlled by the electric actuator 304. The electric actuator 304 can be of any suitable construction and is operative for forcing each of the linkage arrangements 300 and 302 outward (as shown in FIG. 21) when activated. One suitable electric actuator is described below as a solenoid. However, it will be appreciated that a magnet can alternatively be used.

In operations, when the actuator 304 is activated, the clamping portions 298 are forced outwardly and cooperate with the boss portions 296 to effectively pinch the support columns 82. As a result, vertical movement of the carriage assembly 26 with respect to the support columns 82 is prevented. In the preferred embodiment, the actuator 304 automatically operates to force the clamping portions 298 against the boss portions 296 whenever the motor of the planing machine 10 is energized.

With reference to FIGS. 22 and 23, a fifth alternative embodiment of a carriage assembly locking mechanism 310 will be described. The carriage assembly 26 illustrated is shown to include upper and lower casting portions 312 and 314. For purposes of illustration, the upper casting portion 312 is shown removed from the simplified top view of FIG. 22.

Again, in a manner similar to that shown in FIG. 10, the locking mechanism 310 includes a carriage assembly casting 316 which is formed to include apertures 174 for receiving the vertical support columns 82 of the planing machine 10. Also consistent with the prior discussed embodiments of a locking mechanism, the apertures 174 are toleranced so as to provide a normally present operating clearance between the circumferential side wall of the apertures 174 and the corresponding vertical support column 82. The partial top view of FIG. 22 illustrates the carriage assembly locking mechanism 310 in operative relationship with two of the vertical support columns 82. However, it will be appreciated that a similar mechanism may be symmetrically constructed to cooperate with the other two vertical support columns 82.

With continued reference to FIGS. 22 and 23, the carriage assembly locking mechanism 310 is shown to include a manual actuator (partially shown at 318) interconnected to a pair of lock pins 320 through a pair of connecting links 322. The connecting links 322 each include a first end 324 pivotally connected to the actuator 318 and a second end 326 pivotally connected to its respective lock pin 320. While the manual actuator 318 is not shown in detail, it will be appreciated that any suitable mechanism may be incorporated which is operable to apply a force to the connecting links 322 in the direction of arrow C.

The lock pins 320 are similarly constructed to each include a tapered distal end 328. The upper and lower casting portions 312 and 314 cooperate tolo partially define a narrowing channel 330 into which the locking pins 320 are adapted to advance. The channels 330 are disposed adjacent the apertures 174, are open adjacent the apertures 174 and include an arcuate sidewall opposite the aperture 194.

In use, application of this force in the direction of arrow C causes the lock pins 320 to be advanced outwardly. In turn, the narrowing channels 330 of the carriage assembly casting 316 force the distal ends 328 of the lock pins 320 against the corresponding vertical support column 82. As a result the vertical support columns 82 are deflected and the normally present operating clearances between the vertical support column 82 and their corresponding apertures 174 are eliminated. Thus, vertical movement of the carriage assembly 26 with respect to the vertical support column 82 is substantially prevented.

With reference to the schematic diagram of FIG. 24, an electrical actuator 340 of the present invention will now be described. The electrical actuator 340 of the present invention is intended to operate a manual carriage assembly locking mechanism such as one of the embodiments discussed herein or similar arrangements and comprises a solenoid 340 which is electrically interconnected with a motor 342 of the planing machine 10. The solenoid 340 includes a plunger (not shown) interconnected with a manual output device (e.g. manual actuator such as the manual actuator 318 shown in FIG. 22) of a carriage assembly locking mechanism. The plunger is operative to extend when the solenoid 340 is energized. The solenoid 340 is preferably arranged such that fit is energized whenever the motor 342 of the planing machine 10 is energized. The electrical actuator 340 is further associated with a normally closed override switch 346 adapted to deactivate the solenoid 340 to thereby permit minor adjustment to the carriage assembly 26 when the motor 342 of the planing machine 10 is energized.

When planing a workpiece 29 such as a wooden board, it is typical to carry out different operations which require the carriage assembly 26 to be positioned at different heights. A particular sequence of operations may be repeated many times. It is thus frequently desirable to adjust the minimum depth setting of a planing machine between operations, which is often time consuming and tedious.

Figure 25:
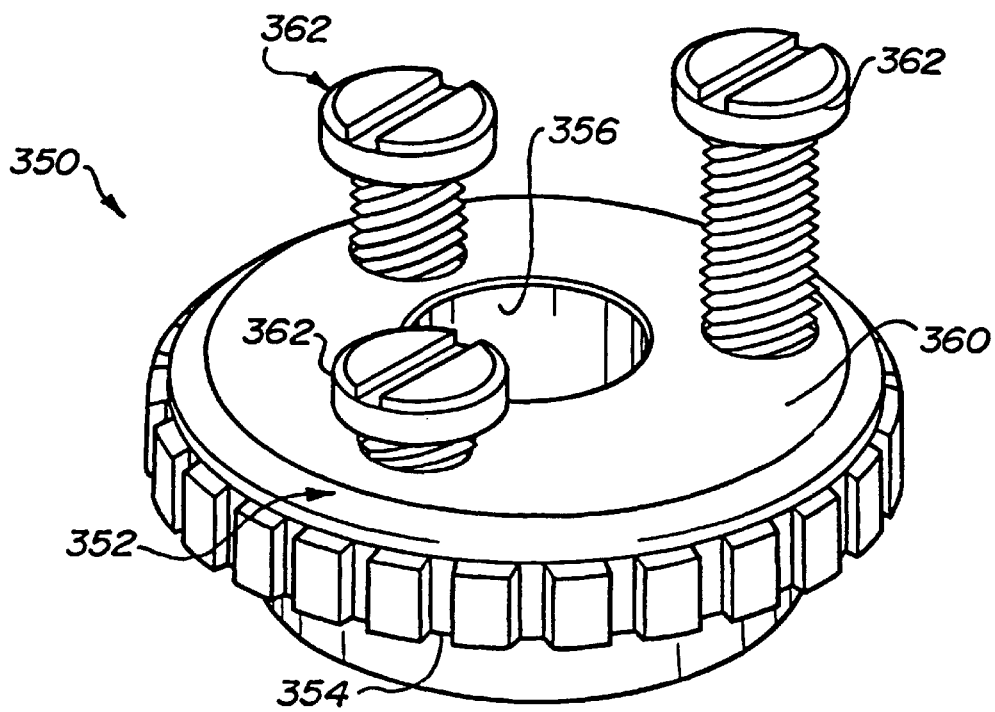
FIG. 25 is an enlarged perspective view of the depth stop adjustment mechanism of FIG. 3.

With reference to FIGS. 3 and 25, a depth stop adjustment mechanism 350 constructed in accordance with the teachings of the present invention will now be described. The depth stop adjustment mechanism 350 is shown to include a generally toroidal-shaped main body portion 352. The peripheral edge of the main body portion 352 is formed to include a ribbed exterior surface 354. The main body portion 352 defines a central aperture 356 for receiving a pin 358 about which the main body portion 352 may rotate and is adapted to be supported on an upper surface of the base 20 of the planing machine 10 within the workpiece opening 28 (as shown in FIG. 3). Alternatively, it will be appreciated that the depth stop adjustment mechanism 350 can be position in any of a number of locations in which the depth stop screws 210 are disposed to prohibit downward advancement of the carriage assembly 26.

The main body portion 352 is further formed to include an upper surface 360 including a plurality of threaded apertures (not specifically illustrated). Each of the apertures is adapted to receive a depth stop screw 362 which can be adjusted to a desired stop setting. In one application, the depth stop screws 362 and corresponding apertures in the main body portion 352 are three in number and are set to the common settings of one-quarter inch, one-half inch and three-quarters inch.

With a screwdriver, the depth stop screws 352 can be quickly and easily adjusted to any desired height.

The depth stop adjustment mechanism 350 further includes a mechanism for positively locating the main body portion 352 in its desired positions. As shown in FIG. 2, the positive locating mechanism includes a locating ball 264 and a coil spring 266. The locating ball 264 is positioned between the main body portion 352 and the coil spring 266 and is biased by the coil spring into engagement with depressions (not shown) formed in the underside of the main body portion. The depressions correspond in number to the plurality of depth screws 262.

The main body portion 352 of the depth stop adjustment mechanism 350 is position so as to partially extend from an opening formed in one of the side walls 14 and 16 of the planing machine. As a result, the depth stop adjustment mechanism 350 may be selectively adjusted by the user from the exterior of the planing machine 10.

In use of the exemplary depth stop adjustment mechanism 350 illustrated, the user adjusts the depth stop adjustment mechanism 350 to one of the three predetermined settings by positioning the appropriately set depth stop screw 362 inwardly toward the workpiece 29. Thus, the depth stop adjustment mechanism 350 of the present invention is readily accessible by the user for quickly and accurately returning of the planing machine 10 to a preset minimum depth. Downward movement of the carriage assembly 26 is eventually opposed by one of the depth stop screws 362, thereby limiting a minimum depth of the workpiece 40.

Figure 26:
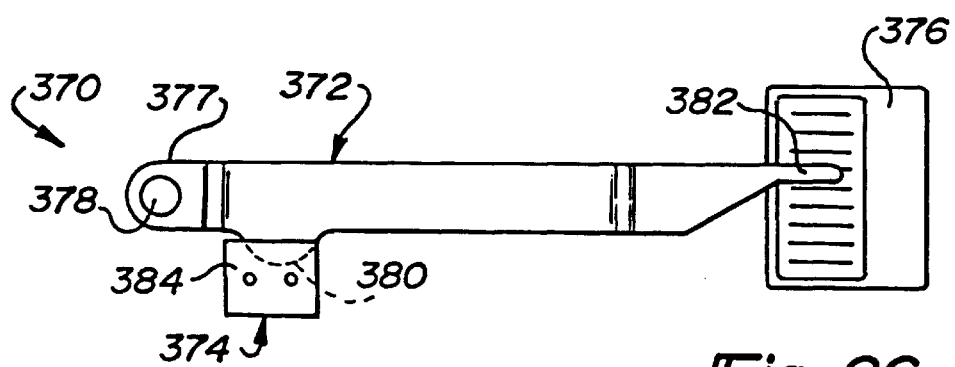
FIG. 26 is a simplified front view of a portion of the material removal indicator assembly shown in FIG. 1 illustrating an indicator in operative relationship with a workpiece engaging member.
Figure 27:
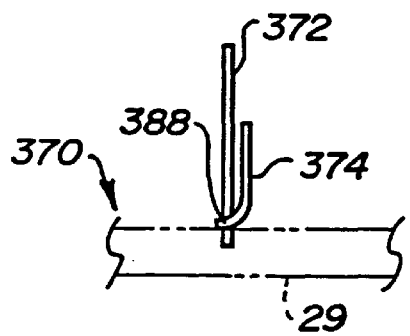
FIG. 27 is a side view of the material removal indicator assembly of FIG. 24 illustrated in operative engagement with a workpiece (shown in broken lines)

With continued reference to FIGS. 1 and 2 and additional reference to FIGS. 26 through 27, a material removal indicator assembly 370 of the present invention will now be described. The material removal indicator assembly 370 is shown to indicator 372 pivotally attached to the carriage assembly 26, a workpiece engagement member 374 and a scale 376.

The indicator 372 of the material removal indicator assembly 370 of the present invention is formed at a first end 377 to include an aperture for receiving a pin 378 to facilitate pivotal attachment to the carriage assembly 26. The indicator 372 is further shown to include a riser point 380 adapted to contact the workpiece engagement member 374 and a forwardly located portion 382, or tip, for cooperating with the scale 376 which is stamped with indicia incrementally representing the amount of material that is being removed from workpiece 29 during a pass through the workpiece opening 28. In one application, the scale 376 is stamped with indicia which begin at 0.05 inches and increases in increments by 0.05 inches.

The workpiece engagement member 376 is shown to include a mounting flange 384 having apertures adapted to receive pins 386 for attachment to the carriage assembly 26. Integrally formed with the mounting flange 384 is a forwardly extending workpiece engaging portion 388. The workpiece engaging portion 240 is inwardly curved to facilitate entry of the workpiece 29 therepast.

Alternative to the independent construction of the workpiece engagement portion 374 and indicator 372, the material removal indicator assembly 370 of the present invention can be constructed to include a single integrally constructed component in this regard, the riser point 380 of the indicator 372 may alternatively be constructed to integrally include a forwardly extending portion (not shown) intended for direct engagement with the workpiece 29. In one application, such a forwardly extending portion would be configured similarly to the forwardly extending workpiece engaging portion 388 of the workpiece engagement portion 374.

In use of the exemplary material removal indicator assembly 370 illustrated, the workpiece engagement portion 374 is resiliently displaced as the workpiece 29 is introduced within the workpiece opening 28. This displacement of the workpiece engagement portion 374 correspondingly results in rotation of the indicator 372 about the pin 378 through contact of the workpiece engagement portion 374 with the riser point 380. The riser point 380 is located on the indicator 372 and is positioned in relationship to the pivot axis defined by the pin 378 such that pivotal displacement of the workpiece engagement portion 374 is magnified by movement of the indicator 372 in front of the scale 376. As a result, small differences in the amount of material to be removed from the workpiece 29 may be readily discerned.

Figure 28:
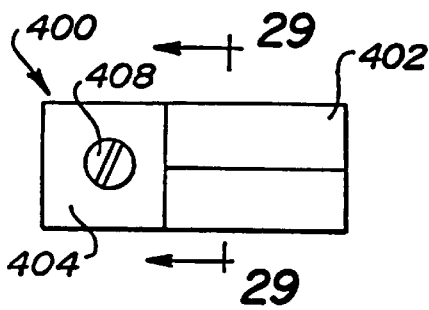
FIG. 28 is a front view of a scale magnification assembly.
Figure 29:
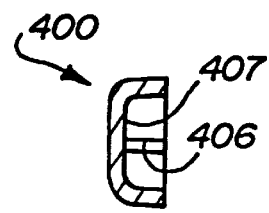
FIG. 29 is a cross-sectional view taken through the line 29—29 of FIG. 28.

With reference to FIGS. 28 and 29, a scale magnification assembly 400 constructed in accordance with the teachings of the present invention will be described. The scale magnification assembly 400 is adapted to cooperate with the scale 106 attached to the carriage assembly 26 for indicating the desired thickness for a workpiece 29. The scale magnification assembly 400 is shown to include a window portion 402 and an attachment portion 404. The scale magnification assembly 400 is preferably constructed of polycarbonate and is operative for magnifying scale indicia (not shown) located behind the window portion 402. Construction of the scale magnification assembly 400 from polycarbonate serves to reduce parallax and provide for fine reading of the scale indicia. The scale magnification assembly 400 is further shown to include a metal blade 406 horizontally mounted to a rear surface 407 of the window portion 402 which assists in visually identifying appropriate scale indicia. Finally, the mounting portion 404 of the scale magnification assembly 400 is formed to include an aperture (not shown) through which a threaded fastener 408 passes for releasably attaching the scale magnification assembly 400 to the planing machine 10.

While the above description constitutes the preferred embodiment and various alternative constructions of the present invention, it will be appreciated that the invention is susceptible to modification, variation, and change without departing from the proper scope or fair meaning of the present invention. In this regard, while the various features of the present invention have been shown and described in connection with a portable wood planer, it will be appreciated by those skilled in that art that many of these features are suitable in connection with other woodworking power tools. For example, many of the features may be readily modified for use with a jointer machine or a combination jointer/planer machine. Further, it will be understood that the teachings of the present invention are equally applicable for planing machines in which a portion of the base is moved relative to a stationary carriage assembly or cutting head.

What is claimed is:

1. A planing machine for automatically planing a workpiece, the planing machine comprising:
    a carriage assembly including at least one cutting member adapted for cutting a surface of the workpiece;
    a workpiece support surface disposed relative to said carriage assembly so as to define a selectively adjustable workpiece opening therebetween;
    one of said carriage assembly and said workpiece support surface mounted within the planing machine for selective bi-directional movement along a path of travel, the other of said carriage assembly and said workpiece support surface fixedly mounted within the planing machine; and
    a depth stop adjustment mechanism interconnected to one of said carriage assembly and said workpiece support surface and at least partially disposed within said workpiece opening, said depth stop adjustment mechanism including a main body selectively moveable between a plurality of operating positions to establish a corresponding plurality of predetermined minimum workpiece dimensions for limiting vertical translation of said carriage assembly toward said workpiece support surface.

2. The planing machine for automatically planing a workpiece of claim 1, wherein said main body is rotatably attached to the planing machine for movement between said plurality of operating positions.

3. The planing machine for automatically planing a workpiece of claim 1, wherein said main body is rotatably about an axis substantially perpendicular to a cutting member axis of rotation.

4. The planing machine for automatically planing a workpiece of claim 2, wherein said main body includes a generally cylindrical outer periphery.

5. The planing machine for automatically planing a workpiece of claim 2, further including a pair of laterally spaced apart sides, said main body at least partially extending through an aperture provided in one of said pair of laterally spaced apart sides.

6. The planing machine for automatically planing a workpiece of claim 2, wherein said depth stop adjustment mechanism further includes a plurality of stop members, said plurality of stop members upwardly extending from said main body.

7. The planing machine for automatically planing a workpiece of claim 5, wherein each stop member of said plurality of stop members are vertically adjustable.

8. The planing machine for automatically planing a workpiece of claim 6, wherein each said stop member of said plurality of stop members threadably engages said main body.

9. A planing machine for automatically planing a workpiece, the planing machine comprising:
    a carriage assembly including at least one cutting member adapted for cutting a surface of the workpiece, said carriage assembly mounted within the planing machine for selective bi-directional movement along a path of travel;
    a workpiece support surface disposed relative to said carriage assembly so as to define a selectively adjustable workpiece opening therebetween, said workpiece support surface fixedly mounted within the planing machine; and
    a depth stop adjustment mechanism interconnected to one of said carriage assembly and said workpiece support surface and at least partially disposed within workpiece opening, said depth stop adjustment mechanism including a main body attached to said workpiece support surface and selectively moveable between a plurality of operating positions to establish a corresponding plurality of predetermined minimum workpiece dimensions for limiting vertical translation of said carriage assembly toward said workpiece support surface.

10. The planing machine for automatically planing a workpiece of claim 9, wherein said main body is rotatably attached to the planing machine for movement between said plurality of operating positions.

11. The planing machine for automatically planing a workpiece of claim 9, wherein said main body is rotatably about an axis substantially perpendicular to a cutting member axis of rotation.

12. The planing machine for automatically planing a workpiece of claim 10, wherein said main body includes a generally cylindrical outer periphery.

13. The planing machine for automatically planing a workpiece of claim 10, further including a pair of laterally spaced apart sides, said main body at least partially extending through an aperture provided in one of said pair of laterally spaced apart sides.

14. The planing machine for automatically planing a workpiece of claim 10, wherein said depth stop adjustment mechanism further includes a plurality of stop members, said plurality of stop members upwardly extending from said main body.

15. The planing machine for automatically planing a workpiece of claim 14, wherein each stop members of said plurality of stop members are vertically adjustable.

16. The planing machine for automatically planing a workpiece of claim 15, wherein each said stop member of said plurality of stop members threadably engages said main body.

17. A method of adjusting a planing machine for automatically planing a workpiece to one of a plurality of predetermined minimum workpiece dimensions, the method including the steps of:

provloop a planing machine including a carriage assembly having at least one cutting member adapted for cutting a surface of the workpiece, and a workpiece support surface disposed relative to said carriage assembly so as to define a selectively adjustable workpiece opening therebetween;

providing a depth stop adjustment mechanism including a main body and a plurality of depth stop members extending from said main body;

mounting said main body to the planing machine substantially within said workpiece opening for movement between a plurality of operating positions;

moving said main body between said plurality of operating positions to establish a selected one of said plurality of predetermined minimum workpiece dimensions;

vertically adjusting said carriage assembly toward said workpiece support surface; and opposing vertical movement of said carriage assembly toward said workpiece support surface with one of said plurality of depth stop members.

18. The method of adjusting a planing machine of claim 17, wherein said step of moving said main body between said plurality of operating positions includes the step of rotating said main body.

19. The method of adjusting a planing machine of claim 18, wherein said step of rotating said main body includes the step of rotating said main body about a vertical axis.

20. The method of adjusting a planing machine of claim 17, further including the step of vertically adjusting at least one of said plurality of depth stop members relative to said main body.

* * * * *

UNITED STATES PATENT AND TRADEMARK OFFICE
CERTIFICATE OF CORRECTION

PATENT NO. : 6,089,287
DATED : July 18, 2000
INVENTOR(S) : Robert E. Welsh et al.

It is certified that error appears in the above-identified patent and that said Letters Patent is hereby corrected as shown below:

Column 16
Line 14, claim 7, "claim 5" should be -- claim 6 --.
Line 17, claim 8, "claim 6" should be -- claim 7 --.

Signed and Sealed this

Ninth Day of October, 2001

*Attest:*

*Nicholas P. Godici*

NICHOLAS P. GODICI
*Attesting Officer*   *Acting Director of the United States Patent and Trademark Office*